UNITED STATES PATENT OFFICE.

WILHELM HASENBACH, OF MANNHEIM, GERMANY.

PURIFYING HYDROCHLORIC-ACID GASES.

No. 862,906.        Specification of Letters Patent.        Patented Aug. 13, 1907.

Application filed June 22, 1906. Serial No. 322,929.

*To all whom it may concern:*

Be it known that I, WILHELM HASENBACH, a subject of the German Emperor, and resident at Mannheim, Germany, have invented certain new and useful Improvements in Purifying Hydrochloric-Acid Gases, of which the following is a specification.

This invention relates to the process of purification of hydrochloric acid, which is the object of my application for U. S. Letters Patent filed December 2nd 1905 Serial No. 289973, and patented under date of November 6, 1906, No. 834,977 and which consists in passing the hydrochloric acid gases of the sulfate furnaces through mineral oils in order to purify them from impurities especially from the chlorin compounds of arsenic. Now in carrying out this process into practice I have found that the mineral oils used for said purifying process are after a short time of their use, altered inasmuch as chlorin enters into the hydrocarbons. Hence follows that the oils are deprived of their purifying properties and get also a greater specific weight than water. A further consequence is that it is necessary to use a definite quantity of the oil for purifying a certain quantity of hydrochloric gas.

The present invention has for its object to overcome this disadvantage. It is based on the discovery made by me that the said rapid alteration of the purifying oils is due to the comparatively high temperature at which the gases leave the sulfate furnace and meet with the oil and that the said alteration is reduced to as less a degree as more the gases are cooled before they come into contact with the oil. Therefore in carrying out my present invention the gases after they have left the sulfate furnace and before they come into contact with the purifying oil are cooled. If the gases are cooled to the ordinary temperature the said alteration of the oil is reduced to such a degree that it needs no more to be considered in practice. Thus the consumption of the oil is so much reduced that the process gives a satisfactory result both in economy and in technical practice.

Claim:—

The herein described process of purifying hydrochloric acid gases which consists in cooling the said gases after they have left the sulfate furnace and bringing the cooled gases into contact with purifying mineral oil whereby the purifying mineral oils are prevented from being altered by the action of chlorin thereon.

In testimony whereof I have signed my name to this specification in the presence of two subscribing witnesses.

WILHELM HASENBACH.

Witnesses:
ALBERT SCHÜLE,
JOS. H. LEUTE.